(12) United States Patent
Cheng et al.

(10) Patent No.: US 7,788,241 B2
(45) Date of Patent: Aug. 31, 2010

(54) METHOD FOR REDUCING OVERHEAD OF VALIDATING CONSTRAINTS IN A DATABASE

(75) Inventors: Qi Cheng, Markham (CA); Haider Abbas Rizvi, Richmond Hill (CA); Calisto Paul Zuzarte, Pickering (CA)

(73) Assignee: International Business Machines Corporation, Armonk, NY (US)

(*) Notice: Subject to any disclaimer, the term of this patent is extended or adjusted under 35 U.S.C. 154(b) by 304 days.

(21) Appl. No.: 11/364,938

(22) Filed: Mar. 1, 2006

(65) Prior Publication Data
US 2007/0208787 A1  Sep. 6, 2007

(51) Int. Cl.
*G06F 17/00* (2006.01)
(52) U.S. Cl. .................... 707/703; 711/161; 711/162
(58) Field of Classification Search .................. 707/1, 707/2, 3, 6, 10, 100, 102, 104.1, 200, 204; 709/205, 231
See application file for complete search history.

(56) References Cited

U.S. PATENT DOCUMENTS

| 6,151,608 A | * | 11/2000 | Abrams | 707/204 |
| 7,240,054 B2 | * | 7/2007 | Adiba et al. | 707/4 |
| 2004/0220911 A1 | * | 11/2004 | Zuzarte et al. | 707/3 |

* cited by examiner

*Primary Examiner*—Apu M Mofiz
*Assistant Examiner*—Anteneh Girma
(74) *Attorney, Agent, or Firm*—Sawyer Law Group, P.C.

(57) ABSTRACT

Methods for reducing the overhead of validating constraints in a database are provided. The method includes providing a target table, and providing a source table. The source table includes data to be loaded into the target table. The method further includes loading data into the target table from the source table including eliminating any logic to validate a constraint defined on the target table based on one or more pre-determined conditions.

19 Claims, 16 Drawing Sheets

METHOD FOR REDUCING OVERHEAD OF VALIDATING CONSTRAINTS IN A DATABASE

FIELD OF THE INVENTION

The present invention relates generally to database management systems, and more particularly to methods for reducing overhead of validating constraints in databases.

BACKGROUND OF THE INVENTION

A constraint is a rule that a database management system (DBMS) typically enforces. A constraint can be used to enforce business rules and are often used to optimize query performance. There are different types of constraints. Two types of constraints in particular are check constraints and referential integrity constraints.

A check constraint sets restrictions on data values that can be added to a column of a specific table. A check constraint can be defined on certain data to ensure that the data adheres to certain business rules. A check constraint ensures that data that does not conform to prescribed business rules is not mistakenly inserted or updated in a database. For example, given a check constraint defined as (salary=basepay+bonus), the database can check whether the value in the salary column for a given employee is equal to the sum of the values in the basepay and the bonus column. A referential constraint is a logical rule about values in one or more columns in one or more tables—i.e., a constraint that is defined between the foreign key and the primary key, the foreign key being in a child table and the primary key being in the parent table. in corresponding tables. The referential integrity constraint would prevent adding a row to the child table where the values in the foreign key column or columns do not exist in a row in the parent table.

Other than for enforcing business rules, database administrators are encouraged to define check constraints and referential integrity constraints because database management systems typically use such constraints to optimize performance of queries. For example, a redundant join elimination can occur based on the following scenario. Assume view V1 is defined as follows where pk and fk are the primary key and the foreign key, respectively, in a referential integrity relationship:

```
create view V1 as (select F.*, D.* from F, D where F.pk = D.fk)
Query:
select F.* from V1 where F.x ≧ 'abc'
```

The query above is equivalent to: select F.* from F, D where F.pk=D.fk and F.x≧'abc'. Internally, the query can be optimized to eliminate the join as follows: select F.* from F where F.x≧'abc'. Here, information from the table D is not required to perform the query. In addition, based on the referential integrity relationship, the DBMS may know that there will not be any additional rows added or deleted as a result of the join of the table F to the table D. In other words, every row in the F table will join one and only one row in the D table. Accordingly, eliminating the join of D from the query will give exactly the same result with or without the join.

Check constraints and referential integrity constraints, however, are sometimes expensive to maintain, particularly when loading or deleting large amounts of data. With cross table constraint validation, when data is inserted, updated or deleted in one table, reading or updating data in the other table participating in the defined constraint is typically required. Such actions are particularly expensive especially if constraint checking involves looking at data across partitions in a partitioned environment. In a partitioned environment data needs to be sent across partitions to do the validation and this communication can be expensive.

In most database environments, the movement of data into the production system target tables needs to be done as quickly as possible to minimize the impact on the users of the target tables. The loading of data into the database tables that are used by the database users to satisfy the applications may be performed during a data load window that is typically during off peak database usage time. In order to minimize data loading time (i.e., the length of the data load window), it is necessary to find ways of speeding up the process. In a data warehouse environment, very often, bulk updates are made by first preparing the data in staging tables and then transferring the data from the staging tables to the (production system) target tables during a final load phase. It is usually critical to keep the final load phase as short as possible to allow applications have access to the newly loaded data that is consistent with minimum down time.

Accordingly, what is needed is a system and method for optimizing the performance of bulk loads or updates during critical phases of the load process, e.g., during loading of data into production system target tables. The present invention addresses such a need.

BRIEF SUMMARY OF THE INVENTION

Embodiments of this invention are directed to a method, computer program product, and system for loading data from a source table to a target table. In general, in one aspect, this specification describes a method for loading data from a source table to a target table. The method includes providing a target table, and providing a source table. The source table includes data to be loaded into the target table. The method further includes loading data into the target table from the source table including eliminating any logic to validate a constraint defined on the target table based on one or more pre-determined conditions.

Particular implementations can include one or more of the following features. The constraint can be one of a check constraint, a referential integrity constraint, an automatically generated column, or an enforced functional dependency based on expressions. Generated columns are those that have an expression associated with them and are populated and maintained automatically when a row is inserted or updated. Enforced functional dependencies also have an expression associated with them such that the database manager verifies that the values supplied by the insert or update operation satisfy the expression. Enforcing functional dependencies and evaluating the expression to be inserted into generated columns can be treated in much the same way as check constraints for the purpose of the method proposed and will not be explicitly mentioned from here onwards. The one or more pre-determined conditions can include verification that the constraint defined on the target table includes a similar definition to a constraint defined on the source table. Eliminating any logic to validate a constraint defined on the target table based on one or more pre-determined conditions can include verifying that there is a constraint defined on the source table that has a similar definition to the constraint defined on the target table, verifying that data from a column of the source table involved in the constraint is to be inserted into a corresponding column of the target table that is involved in the similar constraint definition on the target table, and verifying that the data in the column of the source table is not modified during loading of the data.

Eliminating any logic to validate a constraint defined on the target table based on one or more pre-determined conditions can include verifying that a referential integrity constraint defined between two target tables is similar to a referential integrity constraint defined between two source tables, verifying that data from one or more columns of the source tables is to be inserted into the corresponding columns of the target tables and a parent-child relationship of the referential integrity constraint is similar between the source tables and the target tables, and verifying that the data in the columns from one or more columns of the source tables involved in the constraint are not modified during loading of the data. Eliminating any logic to validate a constraint defined on the target table based on one or more pre-determined conditions can further include verifying that corresponding parent and child table rows which satisfy the referential constraint between the two source tables are loaded together in an appropriate order with no relevant data modifying operations defined on the two target tables during loading of the data. Eliminating any logic to validate a constraint defined on the target table based on one or more pre-determined conditions can include removing pre-existing logic to validate the constraint.

In general, in another aspect, this specification describes a computer program product tangibly stored on a computer-readable medium for loading data from a source table to a target table. The computer program product comprises program instructions operable to cause a programmable processor to provide a target table, provide a source table. The source table includes data to be loaded into the target table. The computer program product further comprises instructions to load data into the target table from the source table including instructions to eliminate any logic to validate a constraint defined on the target table based on one or more pre-determined conditions.

In general, in another aspect, this specification describes a database management system including a target table, a source table including data to be loaded into the target table, and constraint validation logic operable to eliminate any logic to validate a constraint defined on the target table based on one or more pre-determined conditions during loading of the data from the source table into the target table.

Methods and systems are provided that optimizes the performance for bulk loads or updates during critical phases of the load process by avoiding the need to validate data against constraints defined on the target tables if the data has already been validated prior to data loading or earlier during the load process. By avoiding the need to validate data, the time to load data into production target tables—i.e., the data load window—can be significantly reduced. While not limited to data warehouse environments, elimination of constraint checking during the critical load phase of refreshing a database could be a significant improvement in environments that require a large amount of data to be loaded.

The details of one or more implementations are set forth in the accompanying drawings and the description below. Other features will be apparent from the description and drawings, and from the claims.

BRIEF DESCRIPTION OF SEVERAL VIEWS OF THE DRAWINGS

Like reference symbols in the various drawings indicate like elements.

DETAILED DESCRIPTION OF THE INVENTION

Implementations of the present invention relates generally to database management systems, and more particularly to methods for reducing overhead of validating constraints in databases. The following description is presented to enable one of ordinary skill in the art to make and use the invention and is provided in the context of a patent application and its requirements. Various modifications to implementations and the generic principles and features described herein will be readily apparent to those skilled in the art. Thus, the present invention is not intended to be limited to the implementations shown but is to be accorded the widest scope consistent with the principles and features described herein.

Figure 1:
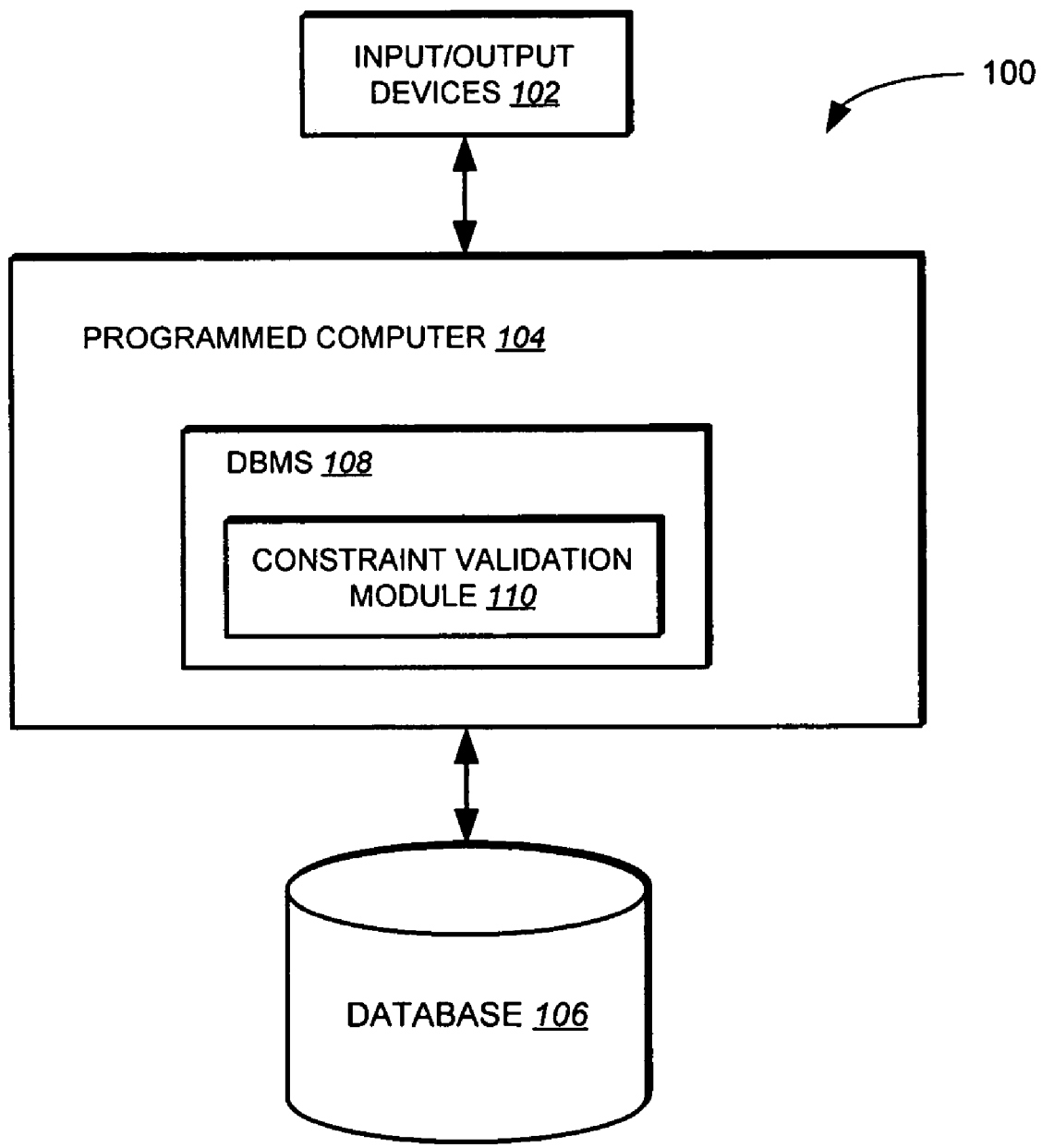
FIG. 1 is a block diagram of a data processing system including constraint validation module in accordance with one implementation of the invention.

FIG. 1 illustrates a data processing system 100 in accordance with one implementation of the invention. Data processing system 100 includes input and output devices 102, a programmed computer 104, and a database 106. Input and output devices 102 can include devices such as a printer, a keyboard, a mouse, a digitizing pen, a display, a printer, and the like. Programmed computer 104 can be any type of computer system, including for example, a workstation, a desktop computer, a laptop computer, a personal digital assistant (PDA), a cell phone, a network, and so on. Database 106 can be a relational database including one or more tables (not shown) for storing data.

Running on programmed computer 104 is a database management system (DBMS) 108 including a constraint validation module 110. In one implementation, the database management system (DBMS) 108 and constraint validation module 110 are features of DB2 available from International Business Machines, Corporation of Armonk, N.Y. In one implementation, constraint validation module 110 optimizes the performance of bulk loads or updates during the critical phases of the load process by avoiding the need to validate data against constraints (such as, but not limited to check constraints and referential integrity constraints) defined on the (production) target tables if the data has already been validated prior to data loading or earlier during the load process. In one implementation, constraint validation module 110 determines conditions where the data has already been checked for violations or if they can be checked through suitable combination of modifying (e.g., update, delete or insert) statements prior to the actual modification of target tables. This may need to be done with either a database administrator having to provide the necessary statement combinations or the database system automatically adjusting the update strategy.

In one implementation, the following scenarios have been considered although there could be additional scenarios including other forms of constraints that might need to be validated or generated, for example, generated columns based on an expression that can be computed on the staging tables but need not be re-computed when the data is loaded into the target tables. In one scenario, two production database (target) tables P and C are provided having a primary key and foreign key referential integrity relationship between the target tables P and C. In addition, two staging tables SP and SC are provided with a similar referential integrity relationship between the staging tables SP and SC as that defined between the target tables P and C. By similar we mean that there are constraints defined on the corresponding columns on SP and SC as there are defined on P and C. The columns involved in the constraints must be the corresponding columns when data is moved from the source tables SC and SP into the target tables C and P. For example, if P has columns pc1, pc2 and pc3, and C has columns cc1, cc2, cc3 and cc4. The referential integrity constraint is defined between C(cc1) and P(pc1) with Pc1 as primary key and cc1 as foreign key. Supposing SP has spc1, spc2 and spc3; SC has scc1, scc2, scc3 and scc4. As part of the loading from the source tables SC and SP into the target tables C and P, respectively, we insert spc1 into pc1 and scc1 into cc1. Now if there is a referential constraint defined between SC(scc1) and SP(spc1) with scc1 as foreign key and spc1 as primary key. Then we say there is a "similar" referential constraint between SC, PC as we have between C and P. In another scenario, a referential integrity constraint between target table P and another table R in the database can be defined and a similar referential integrity constraint can be defined between staging table SP and table R, in which table R is a real table in the database system. In yet another scenario, a check constraint can be defined on staging table SP or staging table SC and a similar check constraint on the corresponding columns with respect to the inserted values was defined on target table P or target table C. A combination of two or more of the above scenarios can also occur.

In one implementation, data is first inserted into the staging tables SP and SC, where the corresponding constraints are validated for the relationships defined on the staging tables SP and SC. The validation of referential integrity constraints between staging tables SP and SC does not affect the access to the real tables that are being used in the production environment. Generally, the staging tables SC and SP are much smaller than the production database tables C and P, respectively. In this case, the validation of referential integrity constraint between staging tables SC and SP is much less expensive than the validation of the referential integrity constraint between production database tables C and P. The validation of constraints between staging table SP and the real table R may be as expensive as validation between the production database table P and the real table R, but this validation is performed (in one implementation) outside of the data load window.

In one implementation, data is ready to be loaded into the database production tables, combined SQL statement are issued to insert rows into database production tables C and P from corresponding staging tables SC and SP if referential integrity exists between database production tables C and P and between staging tables SC and SP. If such a relationship does not exist, then combined SQL statements are not issued. The validation of the referential integrity constraint between the staging table SP and the real table R does affect the access of table R, but this validation can be performed outside of the data load window.

A database manager that ensures integrity of data typically builds the referential integrity validation logic as part of the insert logic to ensure that the constraints on the child and parent tables are not violated. The underlying method in one aspect of the present invention involves recognizing that the new data being loaded together has already been validated against constraint relationships defined on the database productions (target) tables based on prior validation against similar relationships on the source tables (e.g., the staging tables). Note that during the movement of rows between staging tables SP and the database production table P that have a similar referential relationship with the real table R, in one implementation, the referential integrity constraint between the newly loaded data in the database production table P and the real table R do not need to be validated, however, the relevant rows of the real table R (or the table R itself) need to be locked for correctness. Also note that there may be conditions that a constraint must be validated when the values that were previously checked in the staging table is altered (or modified) during loading.

Two methodologies are described below for determining conditions where the data has already been checked for violations or if they can be checked through suitable combination of modifying (e.g., update, delete or insert) statements prior to the actual modification of target tables. A proactive methodology will be first discussed in which constraint validation module 110 recognizes up front that the constraint validation logic need not be defined during loading of data on the target tables. A reactive methodology is also discussed in which constraint validation module 110 removes constraint validation logic that has previously been added when conditions are met (e.g., the constraint validation logic is deemed redundant) that warrant removal the checking validation logic.

Figure 2:
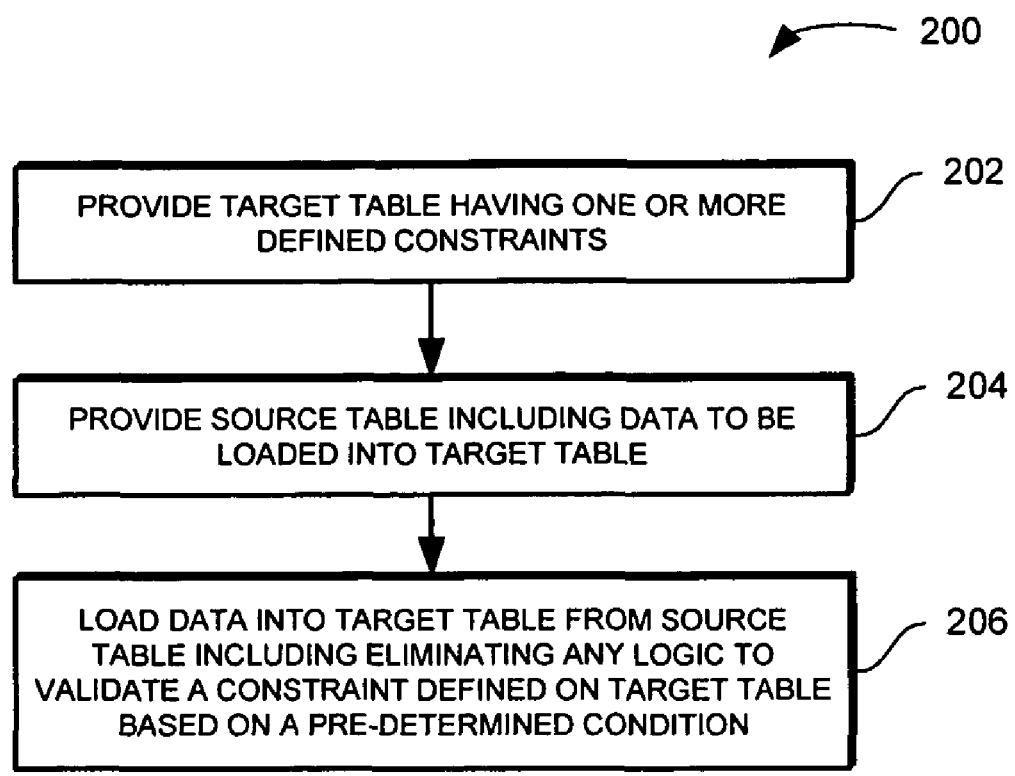
FIG. 2 illustrates a method for loading data into a target table in accordance with one implementation of the invention.

In general, both the proactive and reactive methodologies are in accordance with a method 200 for loading data into a target table as illustrated in FIG. 2. Specifically, a target table is provided (step 202). The target table can have one or more constraints (as discussed above) defined thereon. A source table including data to be loaded into the target table is provided (step 204). Data is loaded into the target table from the source table including eliminating any logic to validate a constraint defined on the target table based on one or more pre-defined conditions (step 206). The pre-determined conditions are discussed in greater detail below. Accordingly, unlike conventional constraint validation modules that typically adds constraint validation logic (or infrastructure) on target tables during loading of data into the target tables, (in one implementation) constraint validation module 110 first determines whether such constraint validation logic (or infrastructure) is required and if such infrastructure is not required then constraint validation logic is not added on the target tables. Alternatively, if such constraint validation logic has previously been added, constraint validation module 110 can remove the constraint validation logic if conditions are met that warrant removal of the infrastructure to validate any constraint checking logic defined on the target tables.

Proactive Methodology

Figure 3A:
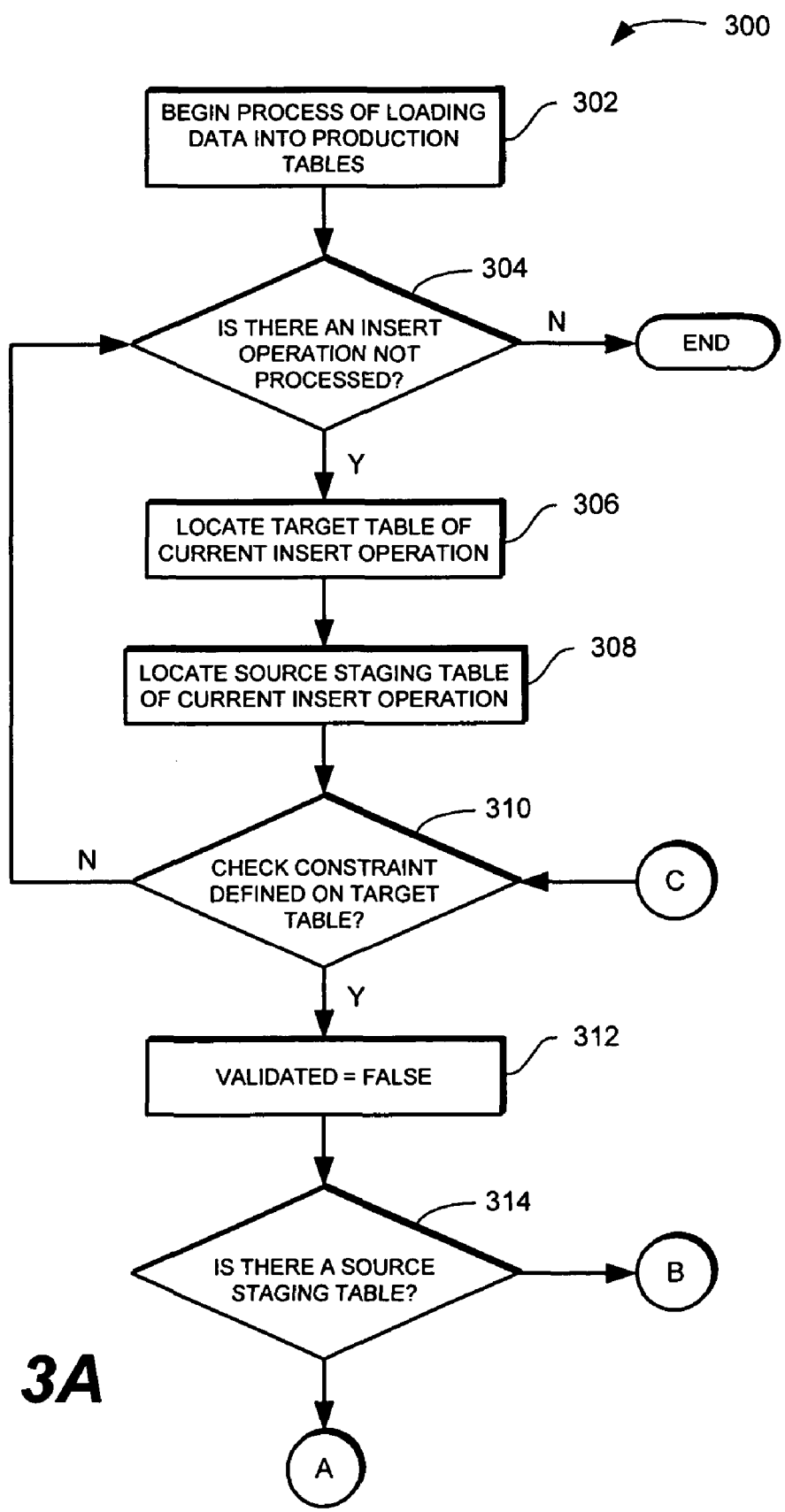
FIGS. 3A-3C illustrate a method for determining whether logic to validate a check constraint needs to be added on a target table in accordance with one implementation of the invention.
Figure 3B:
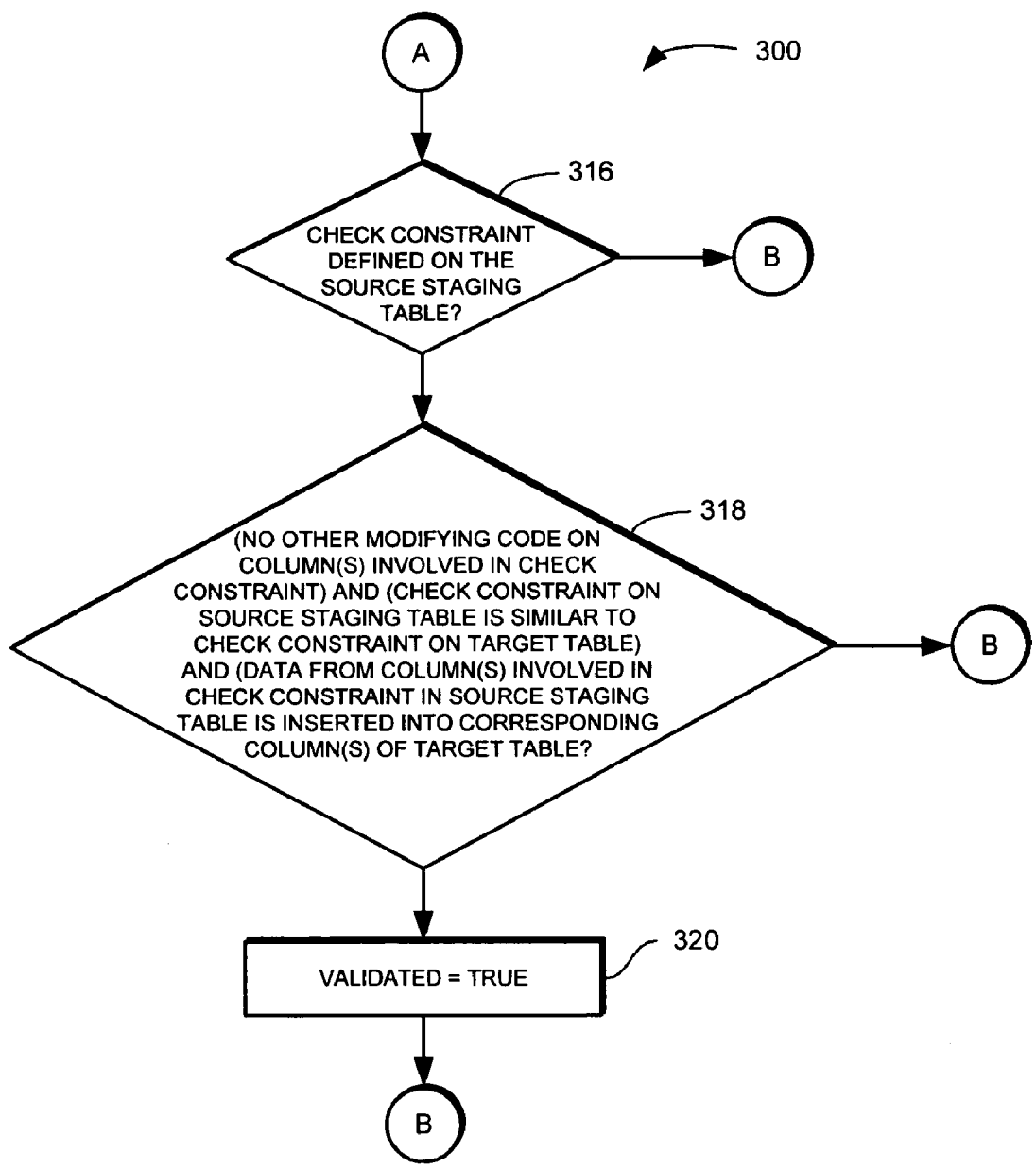
Figure 3C:
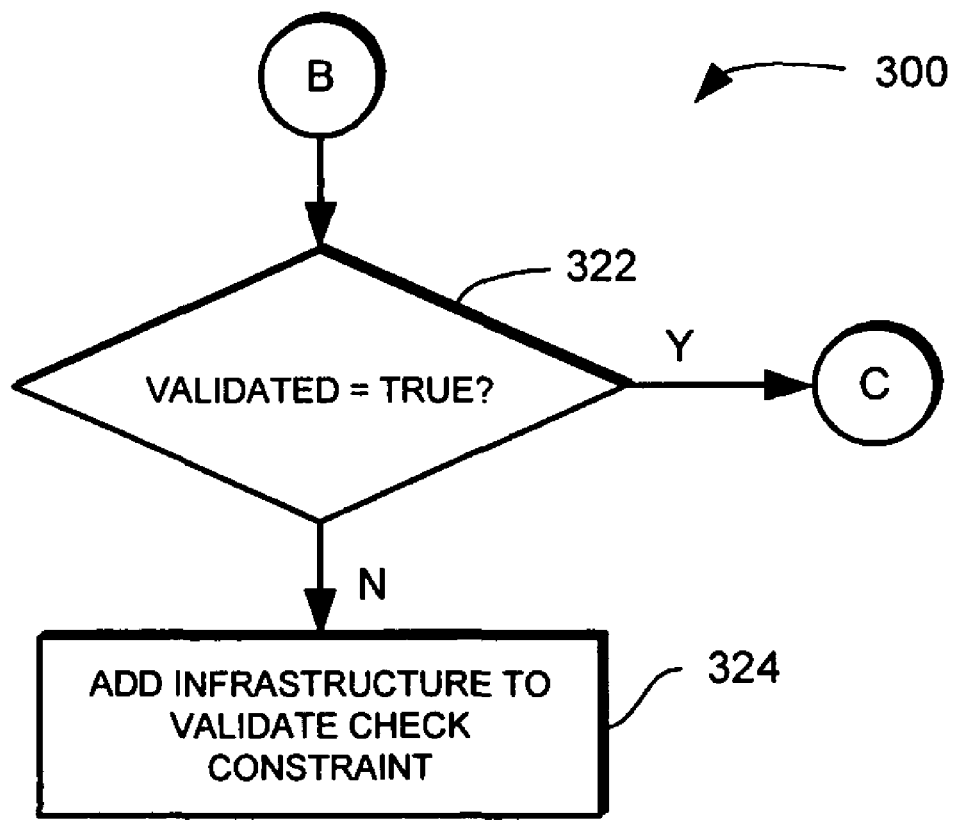

FIGS. 3A-3C illustrate a method 300 for determining whether constraint checking logic to validate a check constraint needs to be added on a target table in accordance with one implementation of the invention. In one implementation, check constraints are assumed to be validated for data within a given row of a table. In other words, a check constraint does not need additional data from a source table or target table besides the data contained in the row itself. Automatically generated columns and enforced functional dependencies are treated in a similar way as check constraints provided that the expressions involved are evaluated with data that does not required data that needs to be obtained from any other than the row under consideration. Referring to FIG. 3A, a process of loading data into production tables (referred to also as target tables) begins (step 302). In one implementation, the data is first inserted into staging tables where the constraints defined on the staging tables have been validated. In this implementation, the process of loading data into the production tables begins with the issuance of a combined SQL statement, if necessary, to insert rows (through one or more insert statements (or insert operations)) from the staging tables to corresponding target tables. A determination is made whether there is an insert operation not yet processed (step 304). If all insert operations have been processed, then method 300 ends. If there is an insert operation not yet processed, a target table associated with the insert operation is located (step 306). A source staging table corresponding to the target table is located (step 308).

A determination is made whether there is a check constraint defined in the target table (step 310). If there is not a check constraint defined on the target table, then method 300 returns to step 304. If there is a check constraint defined on the target table, then a validation flag "validated" is set to FALSE (step 312). In one implementation, the status of the validation flag indicates whether logic to validate constraint checking logic needs to be added on the target tables. A determination is made as to whether a source staging table was located (step 314). If a source staging table was not located, then method 300 proceeds to step 322 (discussed below in connection with FIG. 3C).

Referring to FIG. 3B, if a source staging table was located, then a determination is made as to whether there is a check constraint defined on the source staging table (step 316). If a check constraint is not defined on the source staging table, then method 300 proceeds to step 322. If a check constraint is defined on the source staging table, then a determination is made as to whether all of the following criteria are met: 1) if there is no other modifying code on the column(s) involved in the check constraint; and 2) the check constraint (defined) on the staging table is in a valid state; and 3) the data from the column(s) involved in the check constraint defined on the staging table is to be inserted into corresponding column(s) of the target table that have a similar check constraint defined thereon (step 318). If any of the criteria specified in step 318 are not met, then method 300 proceeds to step 322. If all of the criteria specified in step 318 are satisfied, then the validation flag "validated" is set to TRUE (step 320).

Referring to FIG. 3C, a determination is made as to whether the validation flag "validated" is set to TRUE (step 322). If the validation flag "validated" is set to TRUE, then constraint validation logic 110 does not add constraint validation logic on the target tables, and method 300 returns to step 310. If the validation flag "validated" is set to FALSE, then constraint validation logic 110 adds constraint validation logic (e.g., infrastructure to validate the check constraint) defined on the target table (step 324).

Figure 4A:
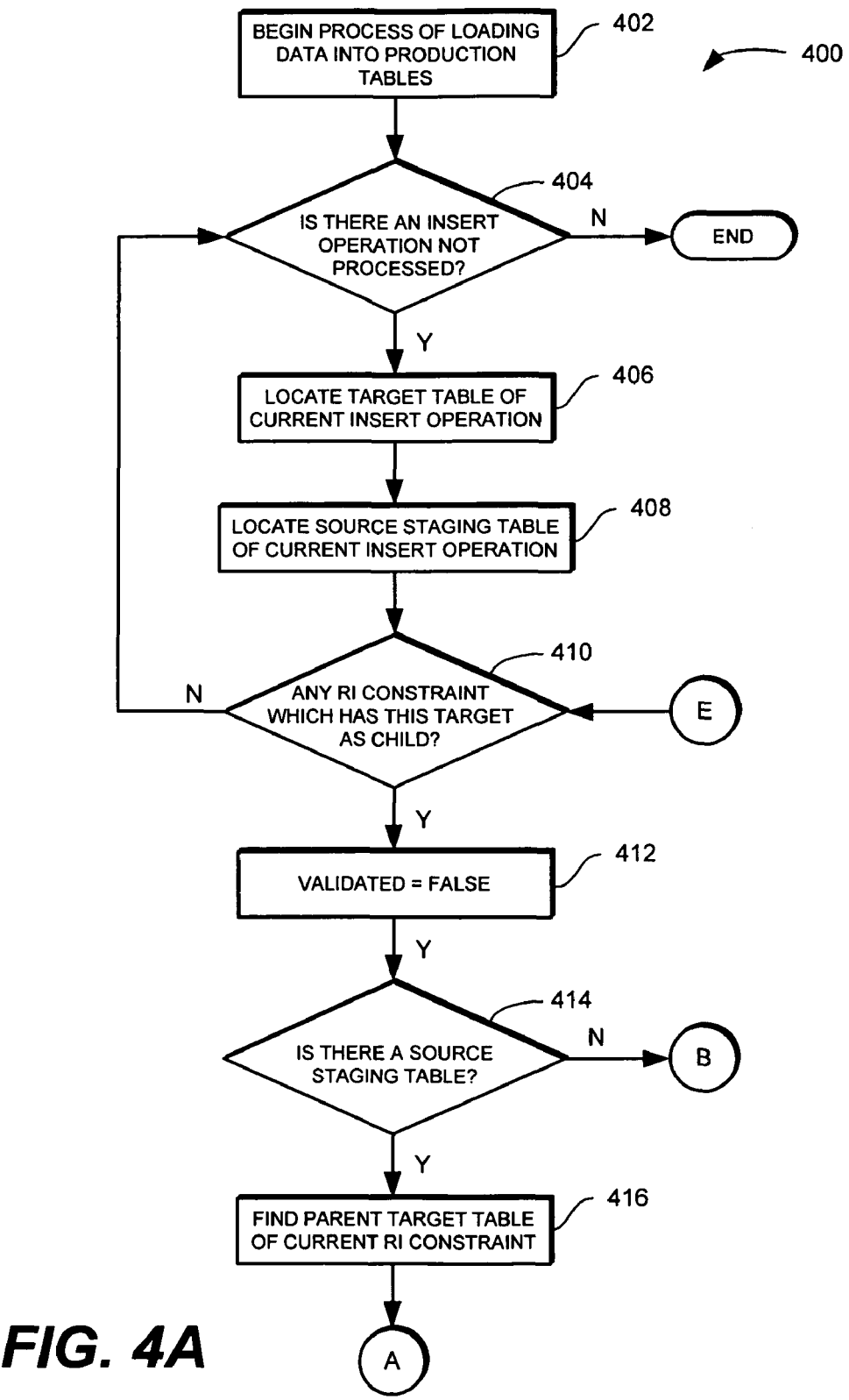
FIGS. 4A-4E illustrate a method for determining whether logic to validate a referential integrity constraint needs to be added on a target table in accordance with one implementation of the invention.

FIGS. 4A-4E illustrate a method 400 for determining whether logic to validate a referential integrity constraint needs to be added on a target table in accordance with one implementation of the invention. Referring to FIG. 4A, a process of loading data into production tables (target tables) begins (step 402). In one implementation, data is loaded into the target tables from corresponding staging tables using one or more insert statements (operations). A determination is made whether there is an insert operation not yet processed (step 404). If all insert operations have been processed, then method 400 ends. If there is an insert operation not yet processed, a target table associated with the insert operation is located (step 406). A source staging table corresponding to the target table is located (step 408).

A determination is made as to whether there is a referential integrity constraint which has the target table defined as a child table (step 410). If there are no referential integrity constraints which have the target table defined as a child table, then method 400 returns to step 404. If there is a referential integrity constraint which has the target table defined as a child table, then a validation flag "validated" is set to FALSE (step 412). A determination is made as to whether a source staging table was located (step 414). If a source staging table was not located, then method 400 proceeds to step 432 (discussed below in connection with FIG. 4E). If a source staging table was located, then a parent target table for the (current) referential integrity constraint is located (step 416).

Figure 4B:
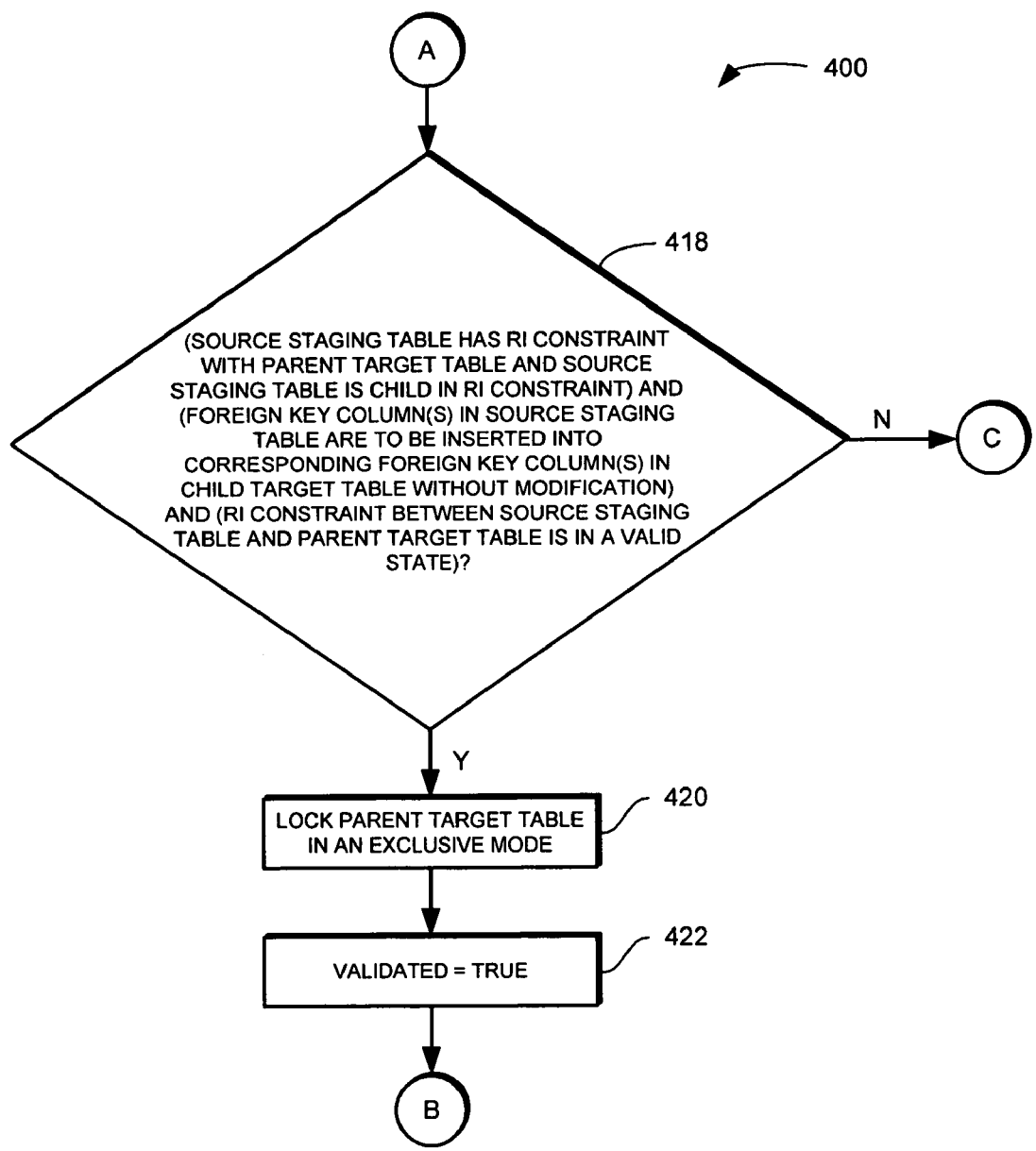

Referring to FIG. 4B, a determination is made as to whether all of the following criteria are met: 1) the source staging table has a referential constraint with the parent target table and the source staging table is the child in the referential integrity constraint; and 2) the foreign key column(s) in the source staging table are to be inserted into foreign key column(s) in the child target table without modification; and 3) the referential integrity constraint between the source staging table and the parent target table is in a valid state (step 418). If any of the criteria specified in step 418 are not met, then method 400 proceeds to step 424 (discussed below in connection with FIG. 4C). If all of the criteria specified in step 418 are satisfied, then the parent target table is locked in an exclusive mode (step 420), to, e.g., prevent access to the parent target table by other outside applications. A validation flag "validated" is set to TRUE (step 422), and method 400 proceeds to step 432.

Figure 4C:
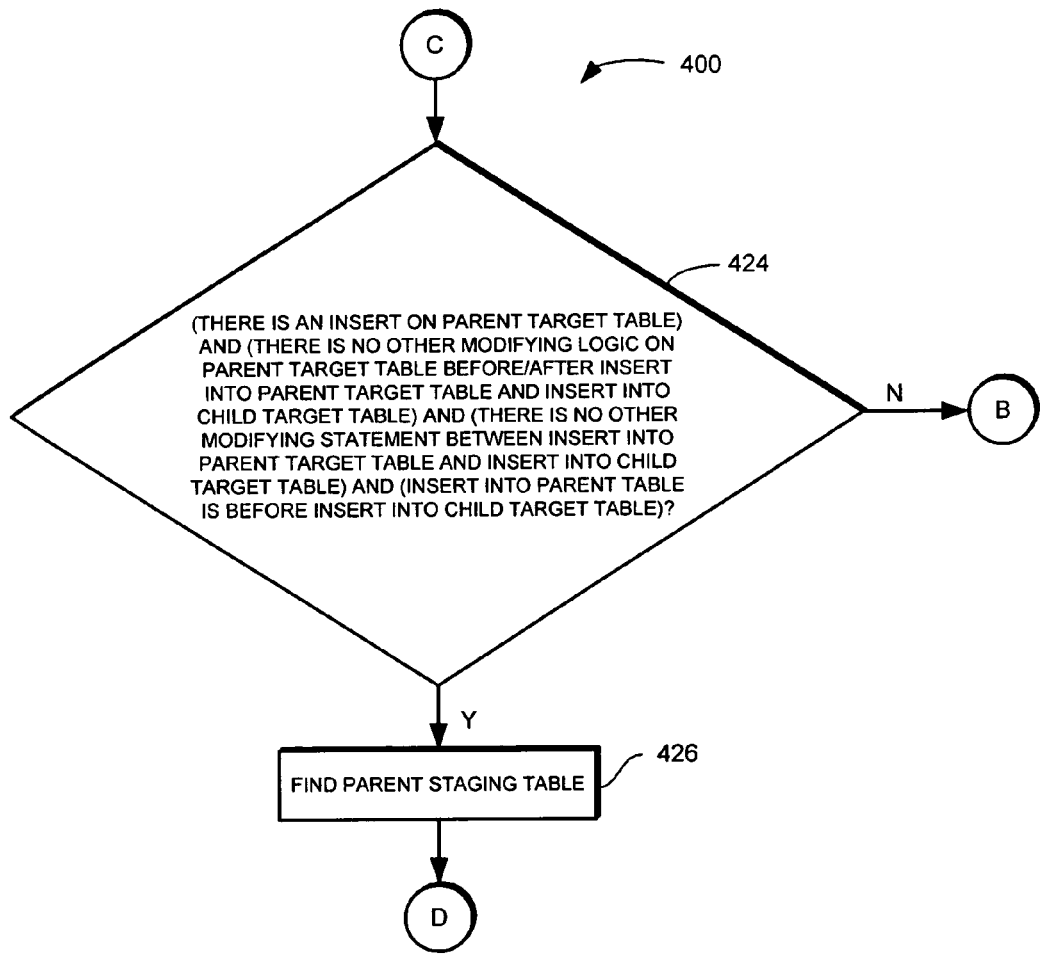

Referring to FIG. 4C, if any of the criteria specified in step 418 are not met, then a determination is made whether all of the next following set of criteria are met: 1) there is an insert on the parent target table); 2) there is no other modifying logic (e.g., a trigger) on the parent target table before or after the insert into the parent target table and insert into child target table; 3) there is no other modifying statement between insert into parent target table and insert into child target table); and 4) insert into patent target table is before the insert into the child target table (step 424). If any of the criteria specified in step 424 are not met, then method 400 proceeds to step 432. Otherwise, if all of the criteria specified in step 424 are satisfied, then the staging table (referred to herein as parent staging table) whose data is to be inserted into the parent target table is located (step 426).

Figure 4D:
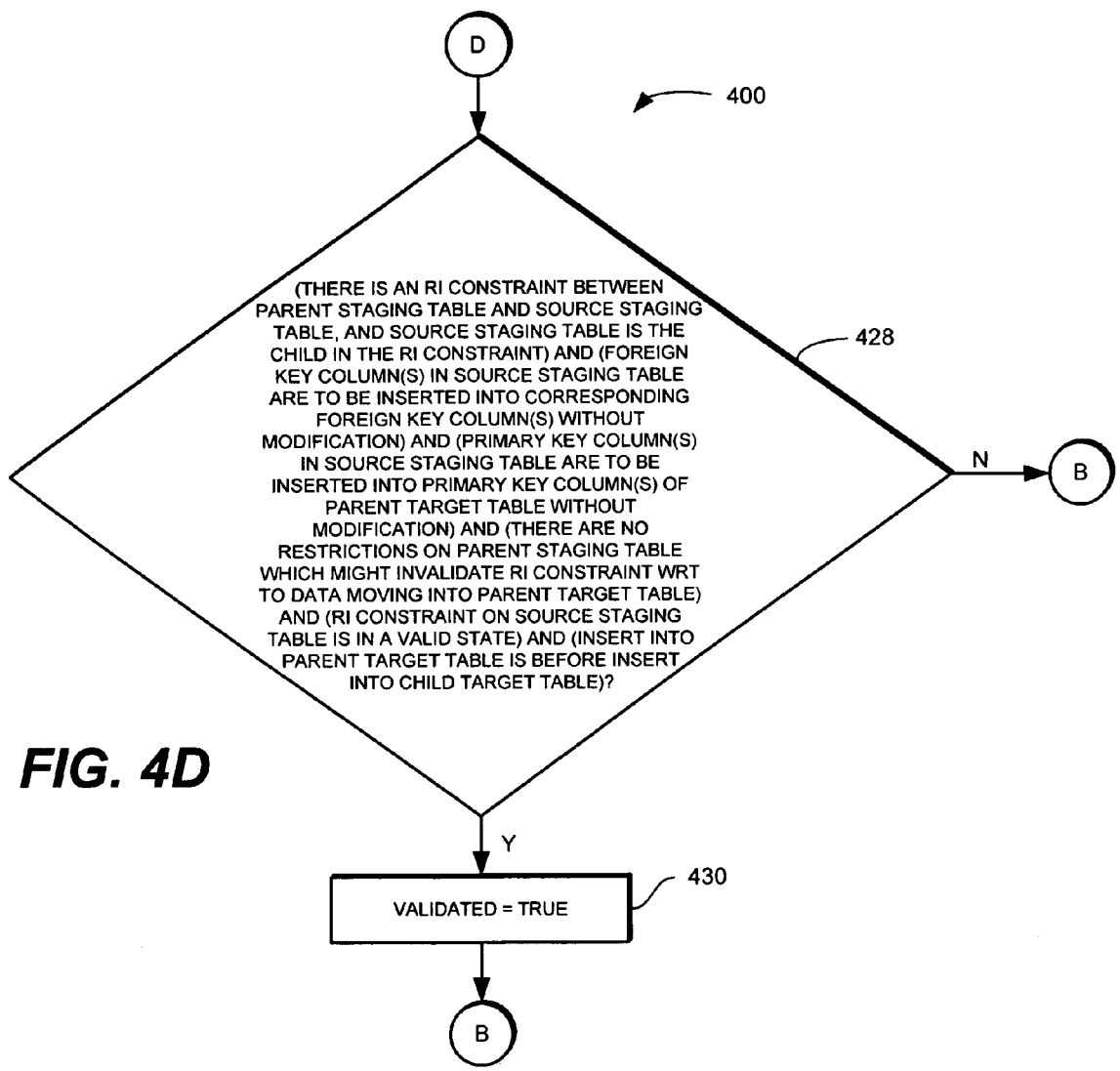

Referring to FIG. 4D, a determination is made as to whether all of the following criteria are met: 1) there is a referential integrity constraint between the parent staging table and the source staging table, and the source staging table is the child in the referential integrity constraint; 2) the foreign key column or columns in the source child staging table are to be inserted into the corresponding foreign key column or columns of the child target table without modification; As well, the primary key column or columns in the source parent staging table are to be inserted into the primary key column or columns of the parent target table without modification; 3) there are no restrictions (e.g., predicates) on the parent staging table which might invalidate the referential integrity constraint with respect to the data to be moved into the parent target table; 4) the referential integrity constraint on the source staging table is in a valid state; 5) the insert into the parent target table is done before the insert into the child target table; and 6) there is no other modification statements between the insert into parent target table and child target table (including triggers) (step 428). If any of the criteria specified in step 428 are not met, then method 400 proceeds to step 432. If all of the criteria specified in step 428 are satisfied, a validation flag "validated" is set to TRUE (step 430), and method 400 proceeds to step 432.

Figure 4E:
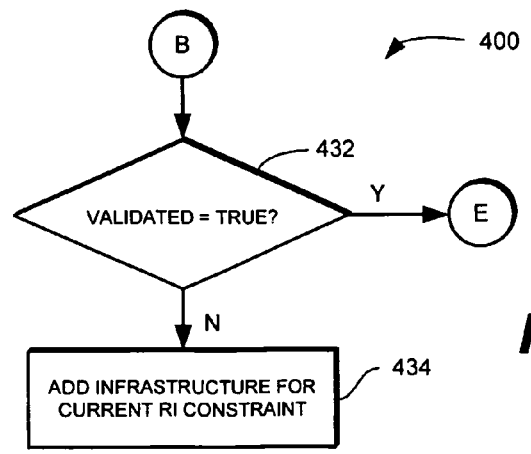

Referring to FIG. 4E, a determination is made as to whether the validation flag "validated" is set to TRUE (step 432). If the validation flag "validated" is set to TRUE, then referential integrity constraint validation logic 110 does not add infrastructure to the target tables to validate the referential integrity constraint defined on the target table, and method 400 returns to step 410. If the validation flag "validated" is set to FALSE, then constraint validation logic 110 adds infrastructure to the target tables to validate the referential integrity constraint defined on the target table (step 434).

Reactive Methodology

Figure 5A:
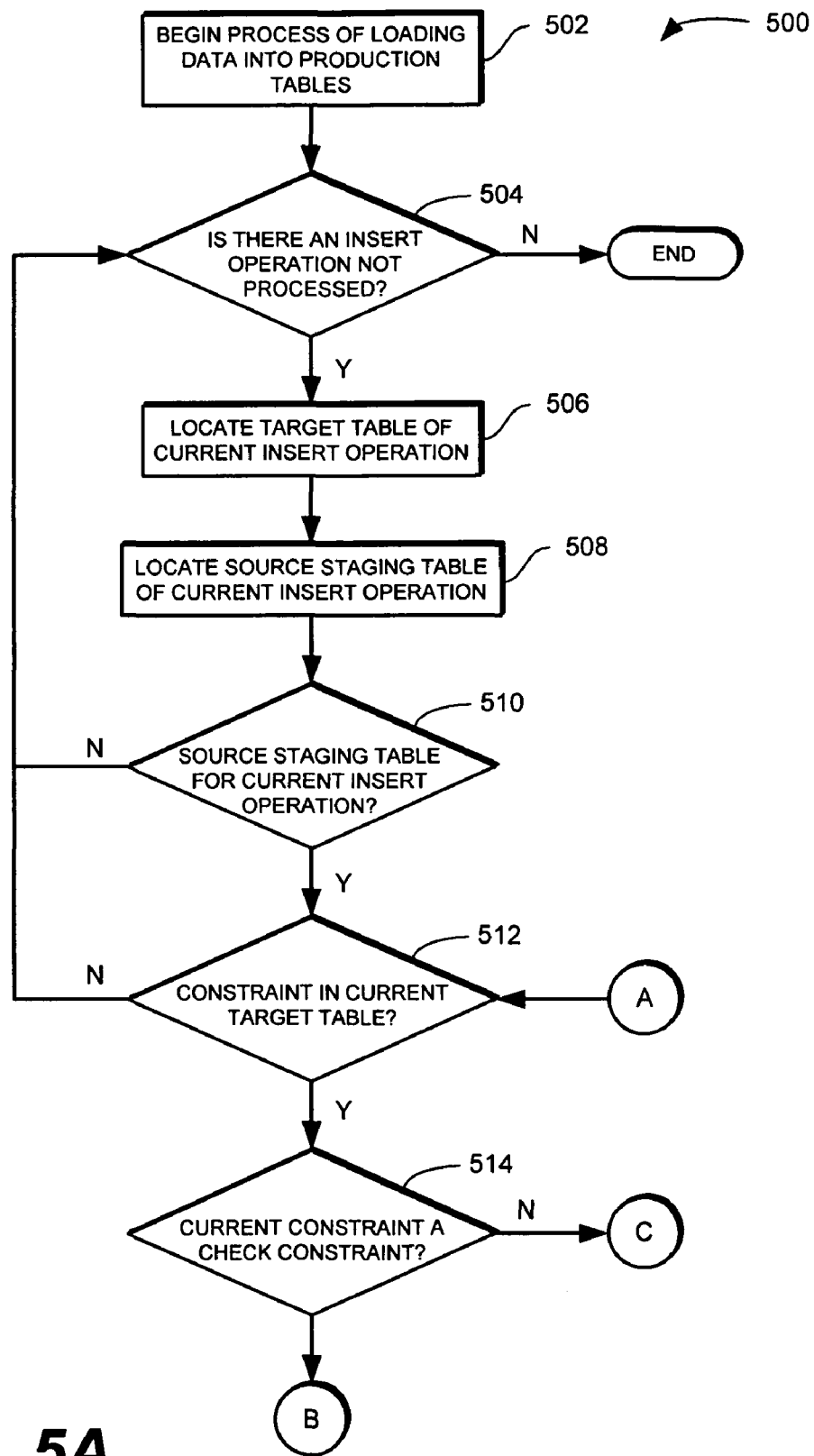
FIGS. 5A-5G illustrate a method for removing logic to validate constraint from a target table in accordance with one implementation of the invention.

FIGS. 5A-5G illustrate a method 500 for removing logic to validate constraint from a target table in accordance with one implementation of the invention. In one implementation, the logic to validate a constraint is removed by DBMS 108 during a query rewrite phase. Referring to FIG. 5A, a process of loading data into production tables (target tables) begins (step 502). In one implementation, data is loaded into the target tables from corresponding staging tables using one or more insert statements (operations). A determination is made whether there is an insert operation not yet processed (step 504). If all insert operations have been processed, then method 500 ends. If there is an insert operation not yet processed, a target table associated with the insert operation is located (step 506). A source staging table corresponding to the target table is located (step 508).

A determination is made as to whether a source staging table was located (step 510). If a source staging table for the current insert operation was not located, then method 500 returns to step 504. Otherwise, a determination is made as to whether there is a constraint associated with the current target table (step 512). If there is not a constraint associated with the current target table, then method 500 returns to step 504. If there is a constraint associated with the current target table, a determination is made as to whether the current constraint is a check constraint (step 514). If the current constraint is not a check constraint, then method 500 proceeds to step 526 (discussed below in connection with FIG. 5D).

Figure 5B:
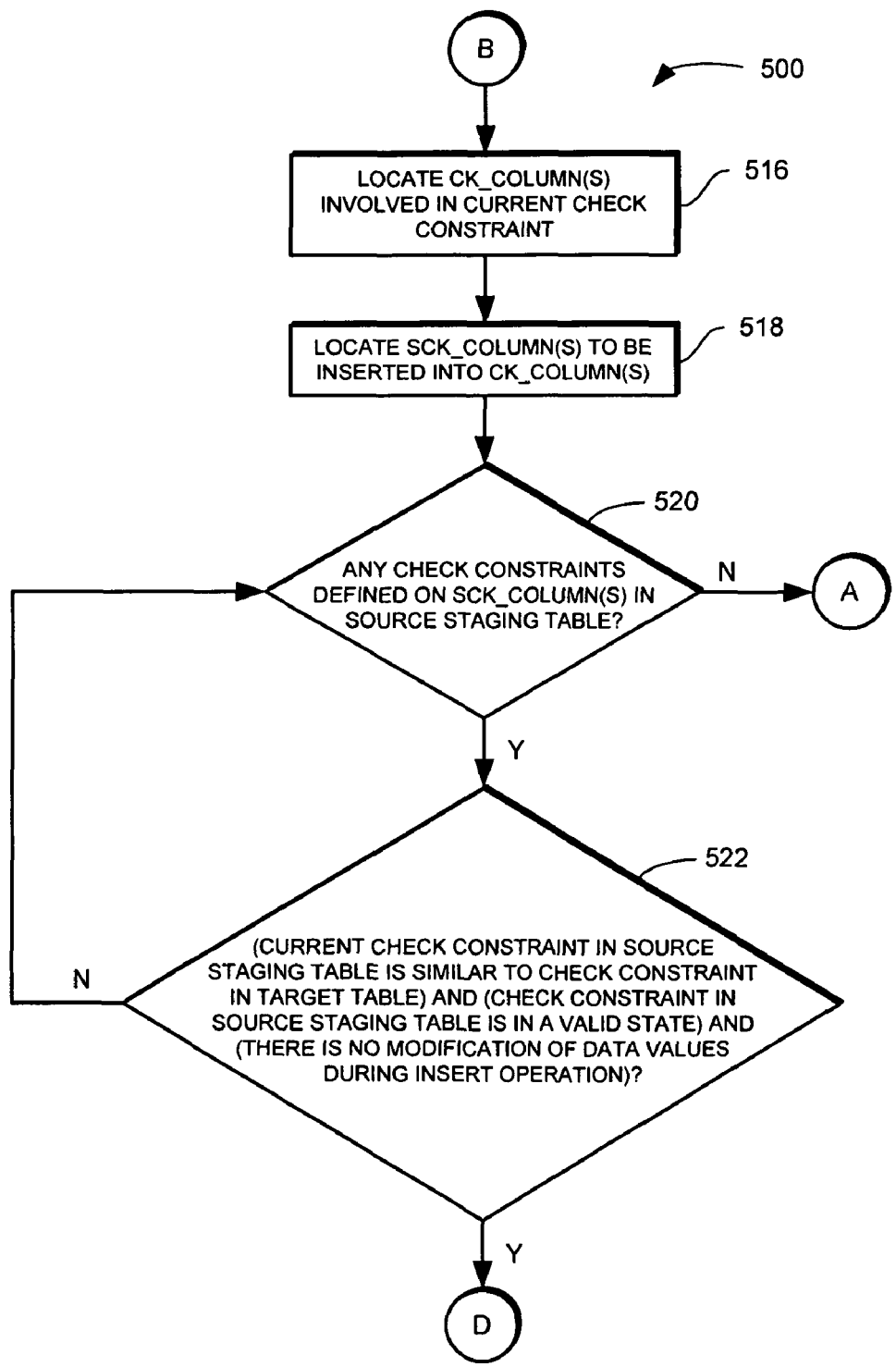

Referring to FIG. 5B, if the current constraint is a check constraint, then the target table column(s) (referred to also as ck_column(s)) involved in the check constraint are located (step 516). The source table column(s) (referred to also as sck_column(s)) to be inserted into the target table column(s) are located (step 518). A determination is made as to whether a check constraint is defined on the source table column(s) in the source staging table (step 520). If a check constraint is not defined on the source table column(s) in the source staging table, then method 500 returns to step 512. If a check constraint is defined on the source table column(s) in the source staging table, then a determination is made whether all of the following criteria are met: 1) the check constraint defined in the source staging table is similar to the check constraint defined in the target table; 2) the check constraint defined in the source staging table is in a valid state; and 3) there is no modification of values during the insert operation (step 522). If any of the criteria specified in step 522 are not met, then method 500 returns to step 520 to process the next check constraint.

Figure 5C:
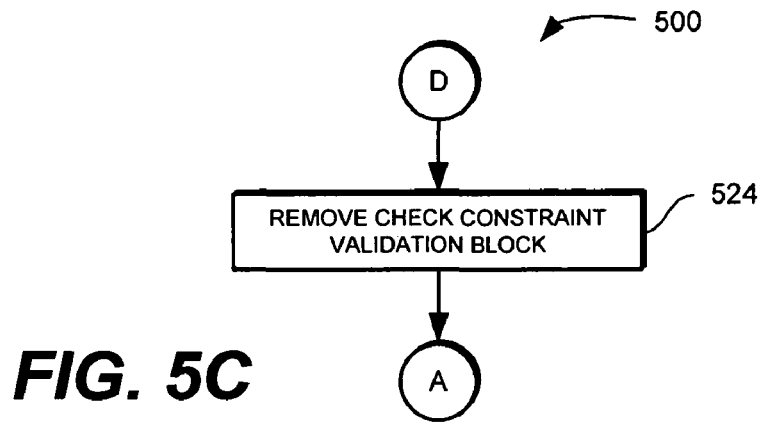
Figure 5D:
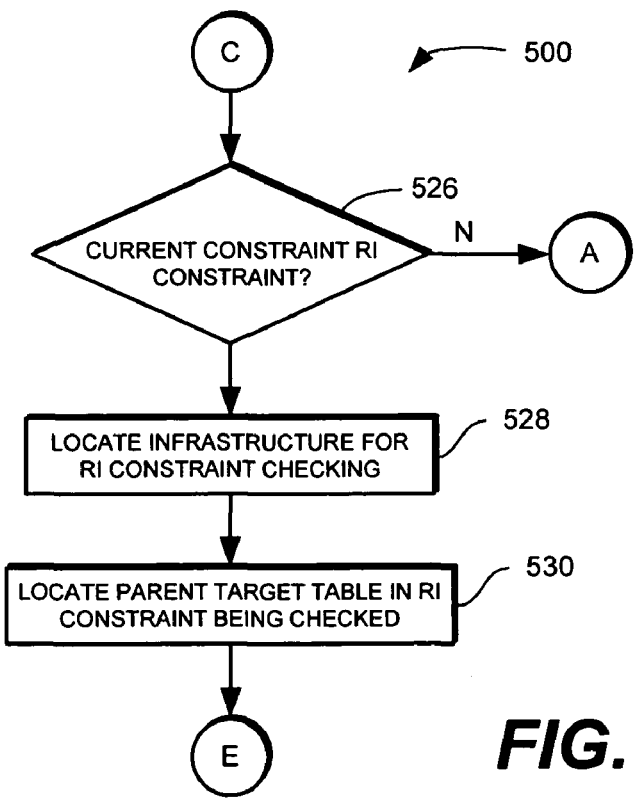

Referring to FIG. 5C, If all of the criteria specified in step 522 are satisfied, then the check constraint validation logic is removed (step 524), and method 500 returns to step 512 to process a next constraint. Referring to FIG. 5D, if the current constraint is not a check constraint (as determined in step 514), then a determination is made as to whether the current constraint is a referential integrity constraint (step 526). If the current constraint is not a referential integrity constraint, then method 500 returns to step 512 to process a next constraint. If the current constraint is a referential integrity constraint, then the infrastructure associated with validating the referential integrity constraint is located (step 528). The parent target table in the referential integrity constraint that is being validated is located (step 530).

Figure 5E:
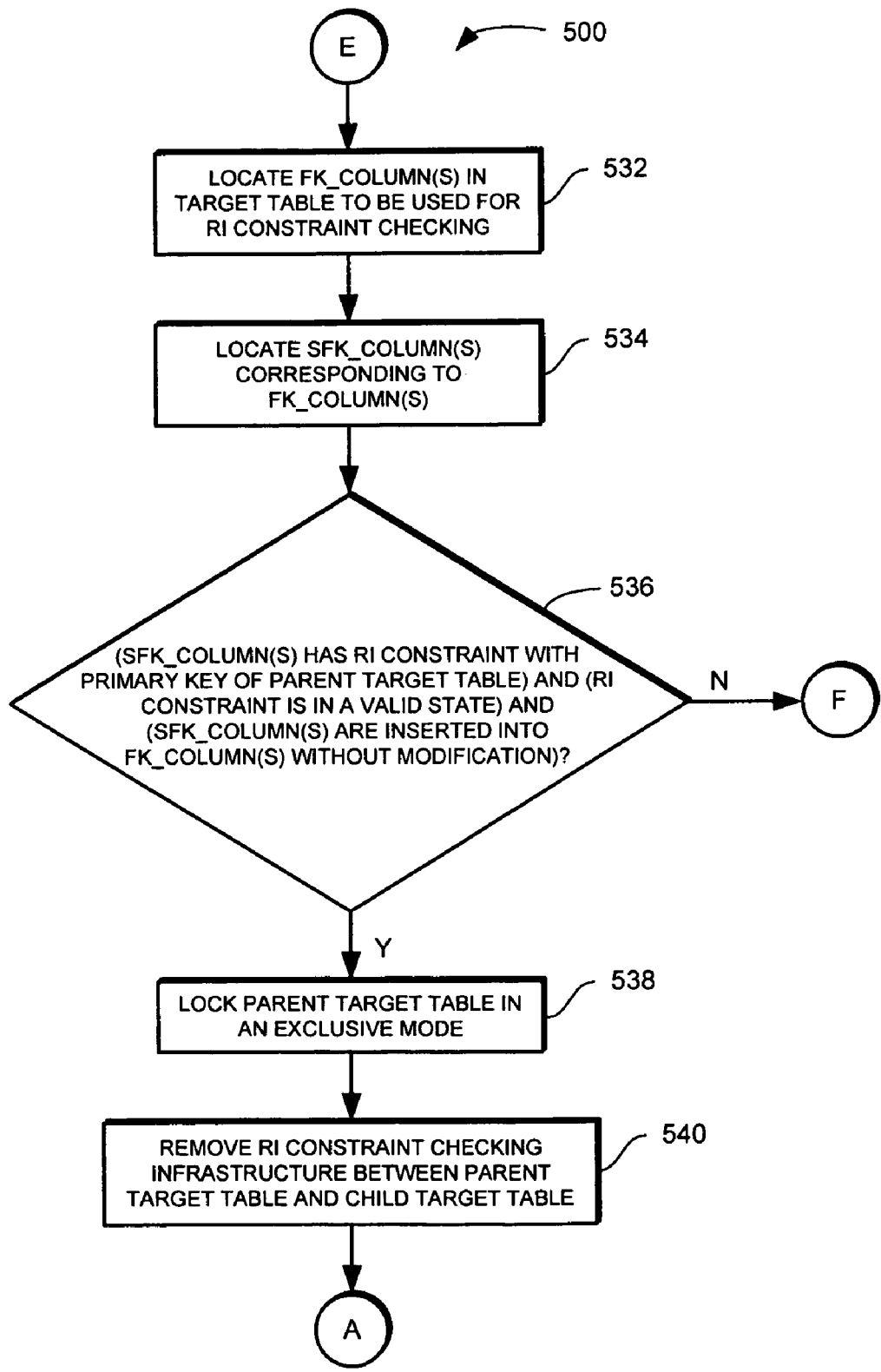

Referring to FIG. 5E, the foreign key column(s) (referred to also as fk_column(s)) in the child target table to be used for referential integrity constraint checking is located (step 532). The column(s) in the source staging table (referred to also as sfk_column(s)) corresponding to the foreign key column(s) in the parent target table are located (step 534). A determination is made as to whether the following criteria is met: 1) the column(s) in the source staging table has referential integrity with the primary key of the parent target table; 2) the referential integrity constraint is in a valid state; and 3) the source foreign key columns are inserted into the target foreign key columns without modification (step 536). If any of the criteria specified in step 536 are not met, then method 500 proceeds to step 542 (discussed below in connection with FIG. 5F). If all of the criteria specified in step 536 are met, then the parent target table is locked in an exclusive mode (step 538). The infrastructure associated with validating the referential integrity constraint is removed (step 540), and method 500 returns to step 512 to process a next constraint.

Figure 5F:
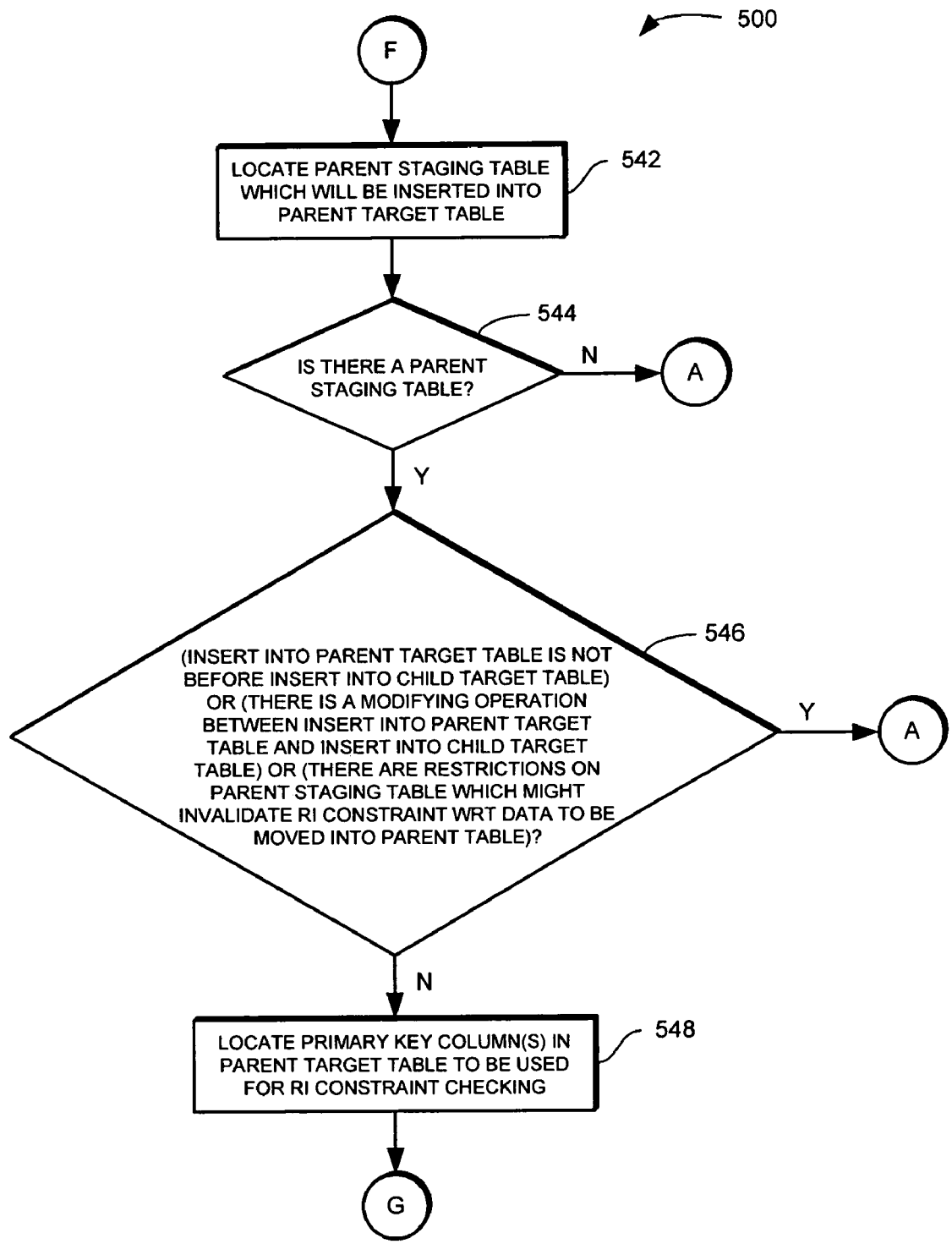

Referring to FIG. 5F, a staging table (referred to herein as parent staging table) to be inserted into the parent target table is located (step 542). A determination is made as to whether there is a parent staging table (step 544). If a parent staging table was not located, then method 500 returns to step 512. If a parent staging table was located, a determination is made as to whether at least one of the following criteria is met: 1) the insert into the parent target table is not before the insert into the child target table); 2) there is a modifying operation between the insert into the parent target table and the insert into the child target table; or 3) there are restrictions (e.g., predicates) on the parent staging table which might invalidate the referential integrity constraint with respect to the data to be moved into the parent target table (step 546). If any of the criteria specified in step 546 are met, then method 500 returns to step 512. Otherwise if none of the criteria specified in step 546 are satisfied then the primary key column(s) in the parent target table to be used for referential integrity checking are located (step 548).

Figure 5G:
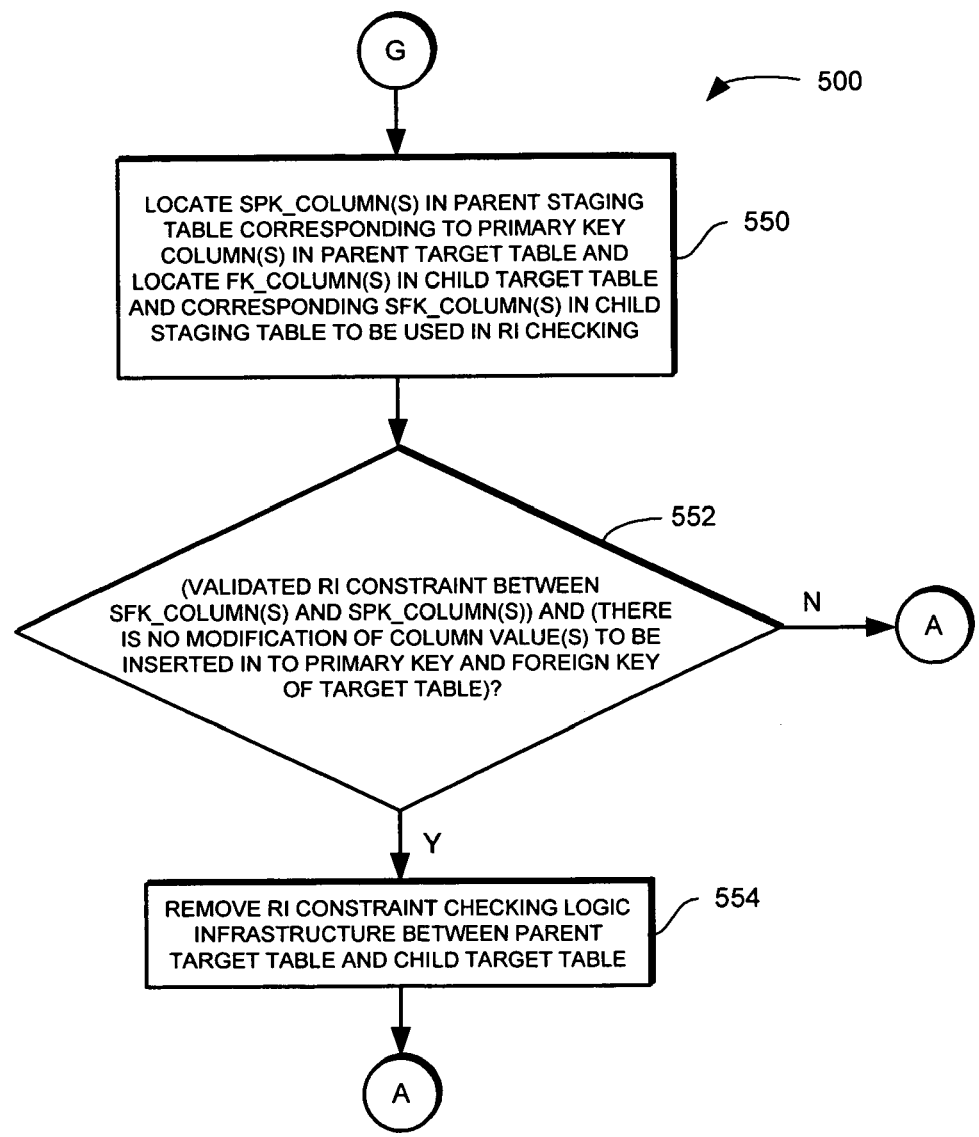

Referring to FIG. 5G, the column(s) in the parent staging table (referred to also as SPK_column(s)) corresponding to the primary key column(s) in the parent target table are located, also foreign key column(s) in the child target table and the corresponding column(s) in the child staging table to be used in the referential checking are located (step 550). A determination is made as to whether there is a validated referential integrity constraint between the column(s) in the parent staging table corresponding to the primary key column(s) in the parent target table (SPK_column(s)) and the column(s) in the source staging table corresponding to the foreign key column(s) (SFK_column(s)) in the child target table, and it is also determined that there is no modification of the column values to be inserted into the primary key and the foreign key of the target tables (step 552). If there is not a validated referential integrity constraint, or modification of values inserted into the primary and foreign key columns, then method 500 returns to step 512 to process a next constraint. If there is no modification of values and a validated referential integrity constraint then the infrastructure associated with validating the referential integrity constraint between the parent target table and the child target table is removed (step 554), and method 500 returns to step 512 to process a next constraint.

One or more of method steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program instructions for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 6:
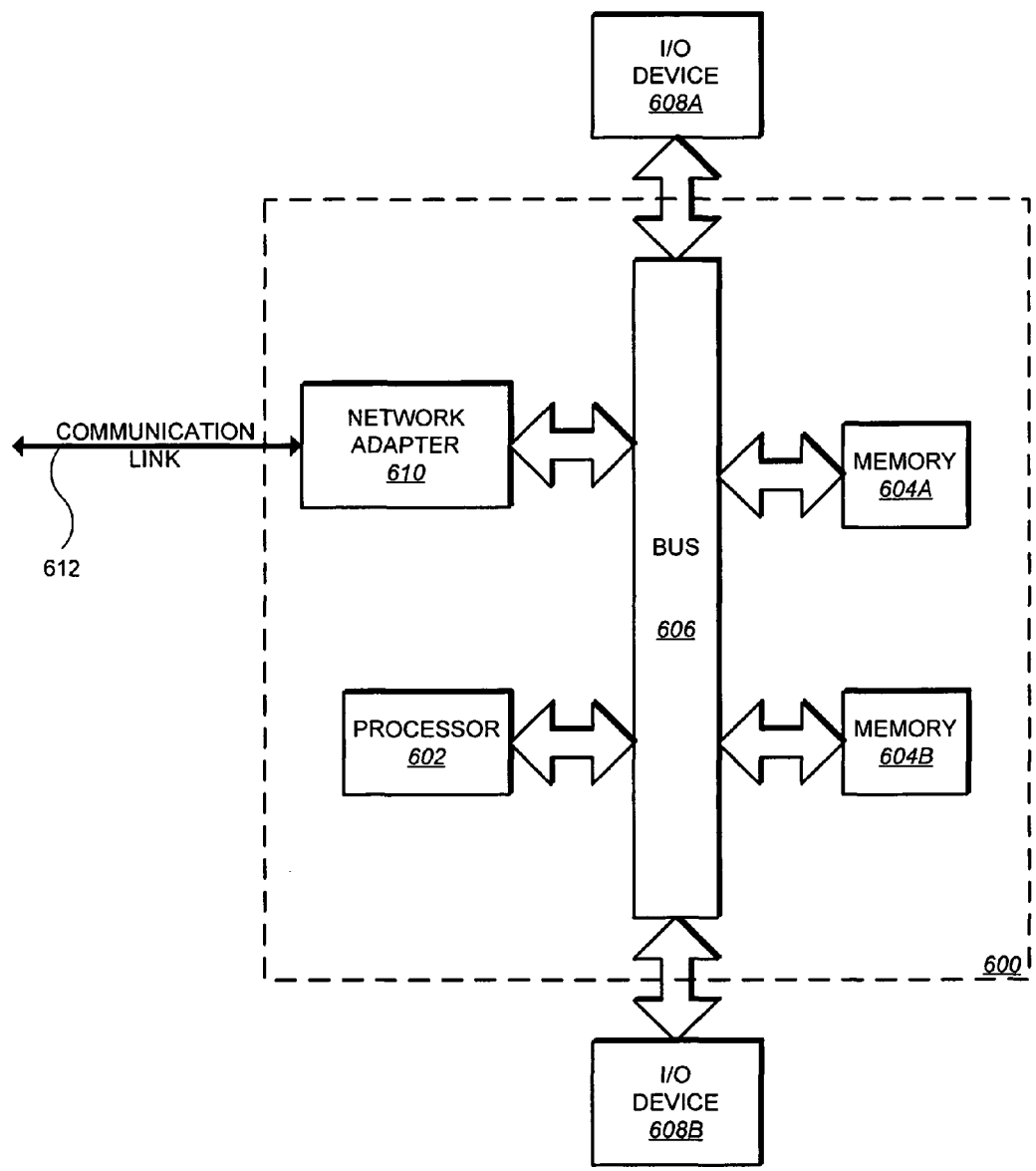
FIG. 6 is a block diagram of a data processing system suitable for storing and/or executing program code in accordance with one implementation of the invention.

FIG. 6 illustrates a data processing system 600 suitable for storing and/or executing program code. Data processing system 600 includes a processor 602 coupled to memory elements 604A-B through a system bus 606. In other embodiments, data processing system 600 may include more than one processor and each processor may be coupled directly or indirectly to one or more memory elements through a system bus.

Memory elements 604A-B can include local memory employed during actual execution of the program code, bulk storage, and cache memories that provide temporary storage of at least some program code in order to reduce the number of times the code must be retrieved from bulk storage during execution. As shown, input/output or I/O devices 608A-B (including, but not limited to, keyboards, displays, pointing devices, etc.) are coupled to data processing system 600. I/O devices 608A-B may be coupled to data processing system 600 directly or indirectly through intervening I/O controllers (not shown).

In the embodiment, a network adapter 610 is coupled to data processing system 600 to enable data processing system 600 to become coupled to other data processing systems or remote printers or storage devices through communication link 612. Communication link 612 can be a private or public network. Modems, cable modems, and Ethernet cards are just a few of the currently available types of network adapters.

Various implementations for managing digital content in an enterprise content management system have been described. Nevertheless, one or ordinary skill in the art will readily recognize that there that various modifications may be made to the implementations, and any variation would be within the scope of the present invention. For example, the steps of methods discussed above can be performed in a different order to achieve desirable results. Accordingly, many modifications may be made by one of ordinary skill in the art without departing from the scope of the following claims.

What is claimed is:

1. A method for loading data from a source table to a target table on a data processing system, the method comprising:
   providing a target table, wherein a constraint is defined on the target table such that validation of data against the constraint allows the data that passes the constraint to be loaded into the target table;
   providing a source table, the source table including particular data to be loaded into the target table;
   loading the particular data into the target table from the source table including:
   1) using the data processing system to check whether a plurality of pre-determined conditions have been met, the predetermined conditions including
      a) the data processing system verifying that the constraint defined on the target table includes a similar definition to a constraint defined on the source table; and
      b) the data processing system checking the source table to determine that the particular data is validated against the constraint defined on the source table prior to loading the particular data into the target table; and
   2) in response to the plurality of pre-determined conditions being met, avoiding validation of particular data against the constraint defined on the target table during the loading of the particular data into the target table, wherein the avoiding validation includes avoiding defining validation logic on the target table or removing pre-existing validation logic defined on the target table, wherein the avoiding validation is performed while keeping the constraint constraints defined on the target table.

2. The method of claim 1, wherein the constraint defined on the target table is one of a check constraint, a referential integrity constraint, a generated column, or an enforced functional dependency.

3. The method of claim 1, wherein the plurality of pre-determined conditions comprises:
   using the data processing system to verify that data from a column of the source table involved in the constraint is to be inserted into a corresponding column of the target table that is involved in the similar constraint definition on the target table; and
   using the data processing system to verify that the data in the column of the source table is not modified during loading of the data.

4. The method of claim 1, wherein the plurality of pre-determined conditions comprises:
   using the data processing system to verify that a referential integrity constraint defined between the target table and a second target table is similar to a referential integrity constraint defined between the source table and a second source table;
using the data processing system to verify that data from one or more columns of the source tables is to be inserted into the corresponding columns of the target tables and a parent-child relationship of the referential integrity constraint is similar between the source tables and the target tables; and
   using the data processing system to verify that the data in the columns from one or more columns of the source tables involved in the constraint are not modified during loading of the data.

5. The method of claim 4, wherein the plurality of pre-determined conditions further comprises verifying that corresponding parent and child table rows which satisfy the referential constraint between the two source tables are loaded together in an appropriate order with no relevant data modifying operations defined on the two target tables during loading of the data.

6. The method of claim 1, wherein avoiding validation of the particular data includes removing pre-existing validation logic defined on the target table, including checking whether the pre-existing validation logic is a check constraint or a referential integrity constraint to validate the data against the constraint.

7. A computer program product tangibly stored on a computer-readable medium for loading data from a source table to a target table on a data processing system, the product comprising program instructions executed by a programmable processor to:

provide a target table, wherein a constraint is defined on the target table such that validation of data against the constraint allows the data that passes the constraint to be loaded into the target table;

provide a source table, the source table including particular data to be loaded into the target table; and load the particular data into the target table from the source table including:

1) use the data processing system to check whether a plurality of pre-determined conditions have been met, the predetermined conditions including a) the data processing system verifying that the constraint defined on the target table includes a similar definition to a constraint defined on the source table; and b) the data processing system checking the source table to determine that the particular data is validated against the constraint defined on the source table prior to loading the particular data into the target table; and 2) in response to the plurality of pre-determined conditions being met, avoid validation of particular data against the constraint defined on the target table during the loading of the particular data into the target table, wherein the avoiding validation includes avoiding defining validation logic on the target table or removing pre-existing validation logic defined on the target table, wherein the avoiding validation is performed while keeping the constraint defined on the target table.

8. The computer program product of claim 7, wherein the constraint defined on the target table is one of a check constraint, a referential integrity constraint, a generated column, or an enforced functional dependency.

9. The computer program product of claim 7, wherein the plurality of pre-determined conditions include instructions to:

use the data processing system to verify that data from a column of the source table involved in the constraint is to be inserted into a corresponding column of the target table that is involved in the similar constraint definition on the target table; and use the data processing system to verify that the data in the column of the source table is not modified during loading of the data.

10. The computer program product of claim 7, wherein the plurality of pre-determined conditions include instructions to:

use the data processing system to verify that a referential integrity constraint defined between the target table and a second target table is similar to a referential integrity constraint defined between the source table and a second source table;

use the data processing system to verify that data from one or more columns of the source tables is to be inserted into the corresponding columns of the target tables and a parent-child relationship of the referential integrity constraint is similar between the source tables and the target tables; and use the data processing system to verify that the data in the columns from one or more columns of the source tables involved in the constraint are not modified during loading of the data.

11. The computer program product of claim 10, wherein the plurality of pre-determined conditions further include instructions to verify that corresponding parent and child table rows which satisfy the referential constraint between the two source tables are loaded together in an appropriate order with no relevant data modifying operations defined on the two target tables during loading of the data.

12. The computer program product of claim 7, wherein the instructions to avoid validation includes removing pre-existing validation logic on the target table~the instructions to pre-existing validation logic including instructions to check whether the pre-existing validation logic is a check constraint or a referential integrity constraint.

13. A database management system comprising:

a target table provided on a storage device, wherein a constraint is defined on the target table such that validation of data against the constraint allows the data that passes the constraint to be loaded into the target table;

a source table including particular data to be loaded into the target table; and a constraint validation module operable to load the particular data into the target table from the source table including:

1) using the data management system to check whether a plurality of pre-determined conditions have been met, the predetermined conditions including a) the constraint validation module verifying that the constraint defined on the target table includes a similar definition to a constraint defined on the source table; and b) the constraint validation module checking the source table to determine that the particular data is validated against the constraint defined on the source table prior to loading the particular data into the target table; and 2) in response to the plurality of pre-determined conditions being met, avoiding validation of the particular data against the constraint defined on the target table during the loading of the particular data into the target table, wherein the avoiding validation includes avoiding defining validation logic on the target table or removing pre-existing validation logic defined on the target table, wherein the avoiding validation is performed while keeping the constraint constraints defined on the target table.

14. The database management system of claim 13, wherein the constraint defined on the target table is one of a check constraint, a referential integrity constraint, a generated column, or an enforced functional dependency.

15. The database management system of claim 13, wherein the plurality of pre-determined conditions includes using the data management system to verify that data from a column of the source table involved in the constraint is to be inserted into a corresponding column of the target table that is involved in the similar constraint definition on the target table, and using the data management system to verify that the data in the column of the source table is not modified during loading of the data.

16. The database management system of claim 13, wherein the plurality of pre-determined conditions comprises:
   using the data management system to verify that a referential integrity constraint defined between the target table and a second target table is similar to a referential integrity constraint defined between the source table and a second source table;
   using the data management system to verify that data from one or more columns of the source tables is to be inserted into the corresponding columns of the target tables and a parent-child relationship of the referential integrity constraint is similar between the source tables and the target tables; and
   using the data management system to verify that the data in the columns from one or more columns of the source tables involved in the constraint are not modified during loading of the data.

17. The database management system of claim 16, wherein the plurality of pre-determined conditions further includes the constrain validation module further verifying that corresponding parent and child table rows which satisfy the referential constraint between the two source tables are loaded together in an appropriate order with no relevant data modifying operations defined on the two target tables during loading of the data.

18. The database management system of claim 13, wherein the constraint validation module avoids validation by removing pre-existing validation logic defined on the target table, including checking whether the pre-existing validation logic is a check constraint or a referential integrity constraint.

19. The database management system of claim 13, wherein the source table and the target table are associated with a relational database.

* * * * *